(12) United States Patent
Kishida et al.

(10) Patent No.: US 12,241,365 B2
(45) Date of Patent: Mar. 4, 2025

(54) OPTICAL CABLE, OPTICAL CABLE MONITORING SYSTEM, AND WELL MONITORING METHOD

(71) Applicant: PETROLIAM NASIONAL BERHAD (PETRONAS), Kuala Lumpur (MY)

(72) Inventors: Kinzo Kishida, Kobe (JP); Ahmad Riza Ghazali, Kajang (MY); Mohamad Faizal bin Abd Rahim, Kajang (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 357 days.

(21) Appl. No.: 17/635,600

(22) PCT Filed: Aug. 14, 2020

(86) PCT No.: PCT/MY2020/050069
§ 371 (c)(1),
(2) Date: Feb. 15, 2022

(87) PCT Pub. No.: WO2021/034184
PCT Pub. Date: Feb. 25, 2021

(65) Prior Publication Data
US 2022/0364460 A1    Nov. 17, 2022

(30) Foreign Application Priority Data

Aug. 16, 2019  (MY) .................... MYPI 2019004724

(51) Int. Cl.
*G01B 11/16*  (2006.01)
*E21B 47/117*  (2012.01)

(52) U.S. Cl.
CPC ............ *E21B 47/117* (2020.05); *G01B 11/16* (2013.01)

(58) Field of Classification Search
CPC ...................................................... G02B 11/16
See application file for complete search history.

(56) References Cited

U.S. PATENT DOCUMENTS

2006/0165344 A1    7/2006  Mendez et al.
2013/0215429 A1    8/2013  Song et al.
(Continued)

FOREIGN PATENT DOCUMENTS

KW    20130135124 A    12/2013

OTHER PUBLICATIONS

Maclean, Alistair, et al., "Detection of hydrocarbon fuel spill using a distributed fibre optic sensor", Sensors and Actuators A: Physical, vol. 109, Issues 1-2, pp. 60-67, Dec. 1, 2003 [Retrieved: Nov. 3, 2020] from [https://doi.org/10.1016/j.sna.2003.08.007] pp. 60-67 (Abstract).

(Continued)

*Primary Examiner* — Eric Wong
(74) *Attorney, Agent, or Firm* — Harness, Dickey & Pierce, P.L.C.

(57) ABSTRACT

An optical cable includes: an optical fiber for sensing deformation of hydrocarbon absorbing resin having a property of expanding by absorbing hydrocarbon in oil; a strand provided so as to surround the outer circumference of the optical fiber; and hydrocarbon absorbing resin filling a space between the optical fiber and the strand. The optical cable configured as described above is installed along the depth direction of a well that is a measurement subject, over the entire range thereof, and a backscatter light frequency shift signal from the optical fiber is measured by a backscatter light measurement device, to detect presence/absence of leakage of oil from the well over the entire range in the depth direction of the well.

5 Claims, 15 Drawing Sheets

(56) References Cited

U.S. PATENT DOCUMENTS

2016/0116308 A1 4/2016 Xue et al.
2019/0310077 A1* 10/2019 Kishida .................. G01L 1/242

OTHER PUBLICATIONS

International Search Report and Written Opinion of the International Searching Authority issued in PCT/MY2020/050069, mailed Nov. 27, 2020; ISA/KR.

* cited by examiner

FIG. 8

SPECIFICATIONS OF MEASUREMENT DEVICE

| MEASUREMENT FUNCTION | PPP-BOTDA | TW-COTDR |
|---|---|---|
| DISTANCE RANGE (m) | 50 | |
| SAMPLING INTERVAL (cm) | 1 | |
| DISTANCE RESOLUTION (cm) | 2 | |
| START FREQUENCY (GHz) | 10.69 | 192100 |
| FINISH FREQUENCY (GHz) | 11.24 | 192300 |
| SWEEP FREQUENCY (MHz) | 5 | 200 |
| NUMBER OF COUNTS | 111 | 1001 |
| PULSE ADJUSTMENT | AVAILABLE | AVAILABLE |
| MEASUREMENT TIME (s) | 240 | 150 |

OPTICAL CABLE, OPTICAL CABLE MONITORING SYSTEM, AND WELL MONITORING METHOD

CROSS REFERENCE TO RELATED APPLICATIONS

This application is a U.S. National Phase Application under 35 U.S.C. 371 of International Application No. PCT/MY2020/050069 filed on Aug. 14, 2020, which claims the benefit of priority from Malaysian Patent Application No. MYPI 2019004724 filed on Aug. 16, 2019. The entire disclosures of both of the above applications are incorporated herein by reference.

TECHNICAL FIELD

The present application relates to an optical cable, an optical cable monitoring system, and a well monitoring method.

BACKGROUND ART

Conventionally, after the usage life of an oil well has ended, a casing which is a structure of the oil well is cut at a certain depth (about 50 m) where there is an outlet port of the oil well and which is defined with reference to the ground surface (in the case of the ground) or the ocean floor (in the case of the ocean) and does not influence a construction, etc. on the ground, and a steel cover provided at the uppermost end of the casing is welded to seal the outlet port of the oil well. Then, a space around the casing is filled with sandy soil. Thus, disposal processing is performed for the oil well of which the usage life has ended.

This disposal processing method was established about 80 years ago, and until now, about fifty thousand oil wells in one year and a total of about four million or more oil wells have been subjected to disposal processing by this method.

However, for example, in California, the United States, contamination of water for cooking that is assumed to be caused by an oil well that has been disposed of (hereinafter, referred to as disposed oil well) has been found, and thus there has been an influence on daily life. Therefore, it is required to take a further strict disposal method.

In addition, in oil wells in the ocean floor off Malaysia, leakage of oil from waste wells (disposed oil wells) is increasing day by day, and thus a problem of marine pollution cannot be ignored any longer.

Thus, at the present when about 100 years have passed since large-scale development for oil began, processing for disposed oil wells and the like is becoming an increasingly important problem, due to an increased number of oil wells and increased oil developments in the ocean.

On the other hand, in the past, there have been almost no examples of studies on processing for disposed oil wells as described above. In most cases, instead of processing for a disposed oil well itself, some relevant elements are targeted, as shown in, for example, the invention of a temporary filler for excavation used in well excavation for producing oil, natural gas, or the like (see, for example, Patent Literature 1) or the invention relevant to processing for accompanying water (fracturing water) produced at the same time as oil or natural gas is extracted from an oil well or a natural gas well (see, for example, Patent Literature 2).

CITATION LIST

Patent Document

Patent Literature 1: International Publication No. 2015/072317
Patent Literature 2: Japanese Laid-Open Patent Publication No. 2018-43221
Patent Literature 3: International Publication No. 2014/181617

Non-Patent Document

Non-Patent Literature 1: Wu, Qian, et al., "Advanced Distributed Fiber Optic Sensors for Monitoring Poor Zonal Isolation with Hydrocarbon Migration in Cemented Annui", Society of Petroleum Engineers. 2016, September 14. doi: 10.2118/180329-MS

SUMMARY OF THE INVENTION

Problems to be Solved by the Invention

Accordingly, in order to further clarify a problem to be solved by the present application, the principle on which oil is leaked in a disposed oil well will be described with reference to FIG. 14. FIG. 14 is a view illustrating the principle on which oil is leaked in a disposed oil well.

As shown in FIG. 14, in a casing forming a well under the ground or the ocean floor or cement surrounding the casing, occurrences of crack (upper part) between a casing surface and a cement surface and crack (lower part) inside the cement are induced by components such as carbon dioxide ($CO_2$), oxygen ($O_2$), and hydrogen sulfide ($H_2S$) in the ground, whereby corrosion of an external casing is also induced. In addition, occurrences of such cracks are induced by stress due to geological movement. Thus, the cracks that have occurred around the well thereafter grow over time, to form a channel from an oil containing layer to an underground drinking water layer or sea water, leading to an accident in which leakage occurs. As another cause, also in the case where an internal corrosion hole is formed in the casing from the inner side of the well, leakage can occur by the internal corrosion hole connecting to the crack, for example.

In the case of California, the United States described above, water containing a radioactive isotope element was injected into the disposed oil well from on the ground, and then, presence of leakage from the oil well was specified when a radiation was detected in underground water. In this California case, if it was determined by some method that the casing was corroded and broken, and the determined part was an upper part of the oil well, the part was repaired by construction work.

In the case where a leakage route can be specified, the following method may be used: as shown in FIG. 15, a specific part of a corresponding casing is bored using an internal-well tool which is inexpensive and effective repair means, and filler grout which is a special adhesive agent is injected through the bore into a gap where a crack causing the leakage has occurred, thereby performing repair. In FIG. 15, a dotted-dashed line S1 indicates a movement route of the internal-well tool, and the tip of an arrow indicates the specific part of the casing. The part repaired by the filler grout is a range S2 enclosed by a trapezoidal dotted-dashed line, and is a part where, of cracks that have occurred in cement outside the oil well, a crack that has occurred on the side closest to the oil well exists. However, in this method, it is difficult to confirm the effect of the repair, i.e., verify that leakage is no longer occurring. It is noted that P indicates the ground surface or the sea surface.

Recently, it has been published that a special overcoat is applied over an optical fiber, and using a property in which the overcoat expands by selectively absorbing hydrocarbon (HC) in oil, it is possible to indicate the presence of the hydrocarbon by sensing the deformation of the overcoat with use of the optical fiber (see, for example, Non-Patent Literature 1). In addition, when the hydrocarbon has disappeared, the expanding deformation may disappear, and thus a possibility that an effect after disconnection of the leakage route can be confirmed has been indicated. However, a method for confirming the effect of the repair remains unsolved.

Further, recently, the scales of oil wells have become increasingly large, and due to this, two significant problems have arisen. The first problem is that corrosion resistance of steel materials or cement originally used is not sufficiently recognized and it has not been assumed that the concentration of carbon dioxide ($CO_2$) in an oil well at a later stage reaches 77% or higher. The second problem is that, with the cost taken at the time of development of the oil well, it is impossible to address such a problem.

As described above, although the possibility of detection by an optical fiber is confirmed, a method for implementation to an oil well has not been verified at present.

The present application has been made to solve the above problem, and an object of the present disclosure is to provide an optical cable, an optical cable monitoring system, and a well monitoring method in which, while regulation and spread of oil technology for which corrosion resistance is taken into consideration are promoted, a leakage route from an oil well is detected and thus the leakage route is specified, thereby enabling verification of the effect of an oil well repair method and enabling long-term monitoring of the oil well.

Solution to the Problems

An optical cable according to the present application includes: an optical fiber; a strand including a plurality of cables provided in a radial direction of the optical fiber, the plurality of cables being twisted so as to surround an outer circumference of the optical fiber and arranged in an annular shape; and hydrocarbon absorbing resin configured to absorb hydrocarbon and filling a gap between the optical fiber and the strand.

Another optical cable according to the present application includes: an optical fiber; a strand including a plurality of cables provided in a radial direction of the optical fiber, the plurality of cables being twisted so as to surround an outer circumference of the optical fiber and arranged in an annular shape; a second strand including a plurality of cables provided in the radial direction of the optical fiber, the plurality of cables being twisted so as to surround an outer circumference of the strand and arranged in an annular shape, the plurality of cables having a larger outer diameter than the cables of the strand; a physical quantity measurement optical fiber provided so as to replace one of the cables of the second strand and configured to measure temperature, strain, or pressure which is a physical quantity of a measurement target; a third strand including a plurality of cables provided in the radial direction of the optical fiber, the plurality of cables being twisted so as to surround an outer circumference of the second strand and arranged in an annular shape, the plurality of cables having a larger outer diameter than the cables of the second strand; and hydrocarbon absorbing resin configured to absorb hydrocarbon and filling gaps between the optical fiber, the strand, the second strand, and the third strand.

Effect of the Invention

The optical cable, the optical cable monitoring system using the optical cable, and the well monitoring method according to the present application can obtain a significant effect that it becomes possible to provide an optical cable, an optical cable monitoring system, and a well monitoring method in which, while regulation and spread of oil technology for which corrosion resistance is taken into consideration are promoted, a leakage route from the oil well is detected and thus the leakage route is specified, thereby enabling verification of the effect of an oil well repair method and enabling long-term monitoring of the oil well.

BRIEF DESCRIPTION OF THE DRAWINGS

FIG. 8 is a table showing the specifications of a measurement device for measuring quantities about the optical cable used in the oil immersion test shown in FIG. 6.

DESCRIPTION OF EMBODIMENTS

Hereinafter, embodiments of the present application will be described with reference to the drawings.

Embodiment 1

Figure 1:
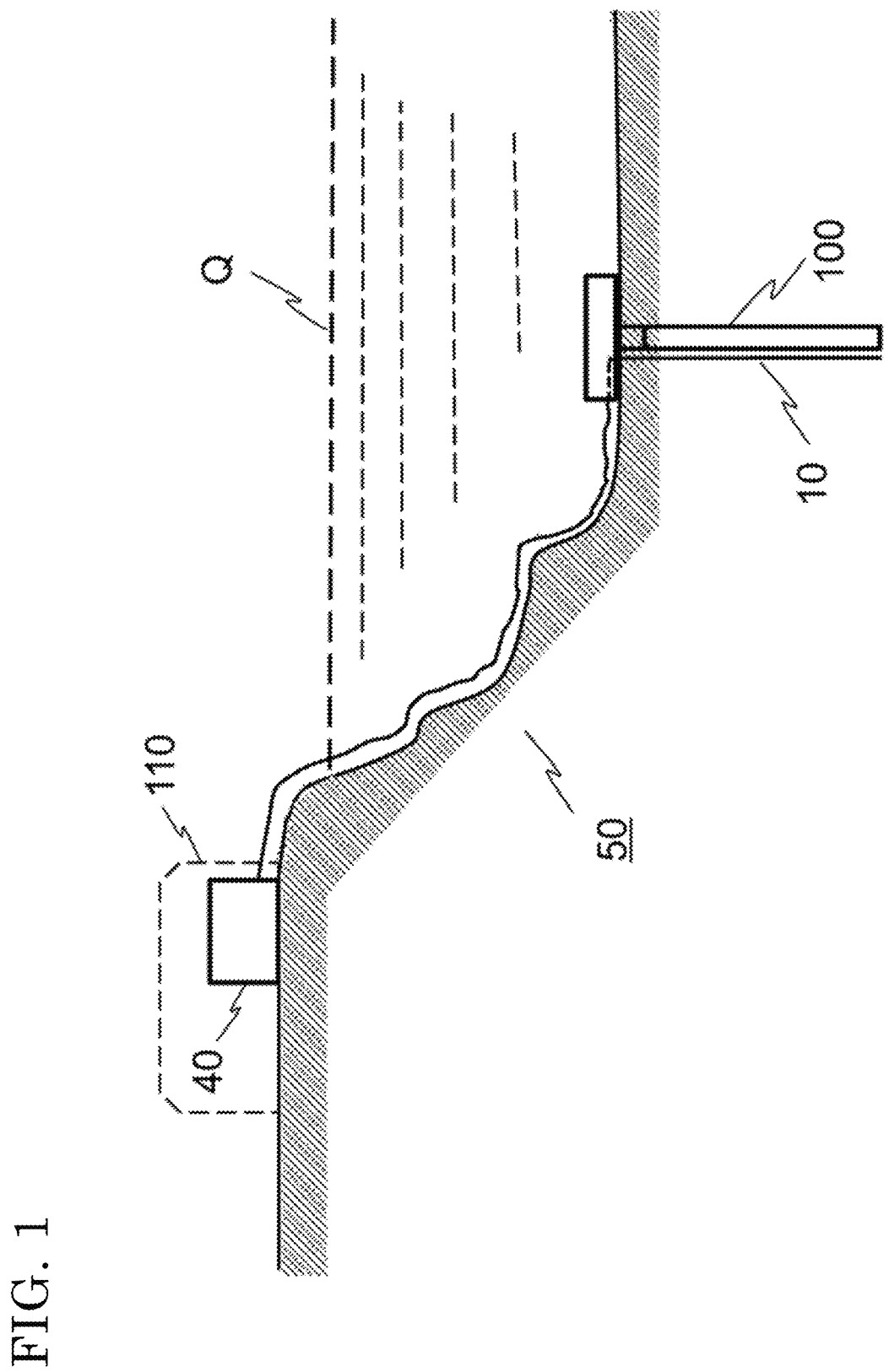
FIG. 1 is a view illustrating an example of an optical cable monitoring system according to embodiment 1.

FIG. 1 is a view showing an example of an optical cable monitoring system 50 according to embodiment 1.

As shown in FIG. 1, in order to monitor a well 100 installed in the ocean floor, a monitoring center 110 is provided with a hybrid-type backscatter light measurement device 40 using both Brillouin scattering and Rayleigh scattering, for processing a signal from an optical fiber. In addition, an optical cable 10 including an optical fiber having a function of detecting hydrocarbon is provided so as to extend along the ocean floor from the monitoring center 110 to the position where the well 100 is installed, and after reaching the installation position of the well 100 (uppermost part of well 100), further extend along the outer periphery of the well 100, to reach the bottom (lowermost part) of the well 100. It is noted that, in FIG. 1, Q indicates the sea surface.

In this case, the backscatter light measurement device 40 and the optical cable 10 having a function of detecting hydrocarbon are connected to each other, to form the optical cable monitoring system 50 in which the backscatter light measurement device 40 measures a frequency shift of scattering light in association with the placed position of the optical cable and the location of leakage of oil from the well is detected on the basis of the measurement value. That is, the optical cable monitoring system 50 includes, as major components, the optical cable 10 and the backscatter light measurement device 40.

By installing the optical cable monitoring system 50 as described above, it is possible to monitor, over a long term of fifty or more years, presence/absence of leakage of oil or the like which is a monitoring target, in a range from the height position corresponding to the ocean floor, which is the uppermost position of the well 100, to the lowermost position of the well 100. Hereinafter, the details of the optical cable monitoring system 50 will be described, focusing on the optical cable used in the optical cable monitoring system 50.

First, the optical cable 10 used in the optical cable monitoring system 50 will be described with reference to the drawings.

Figure 2:
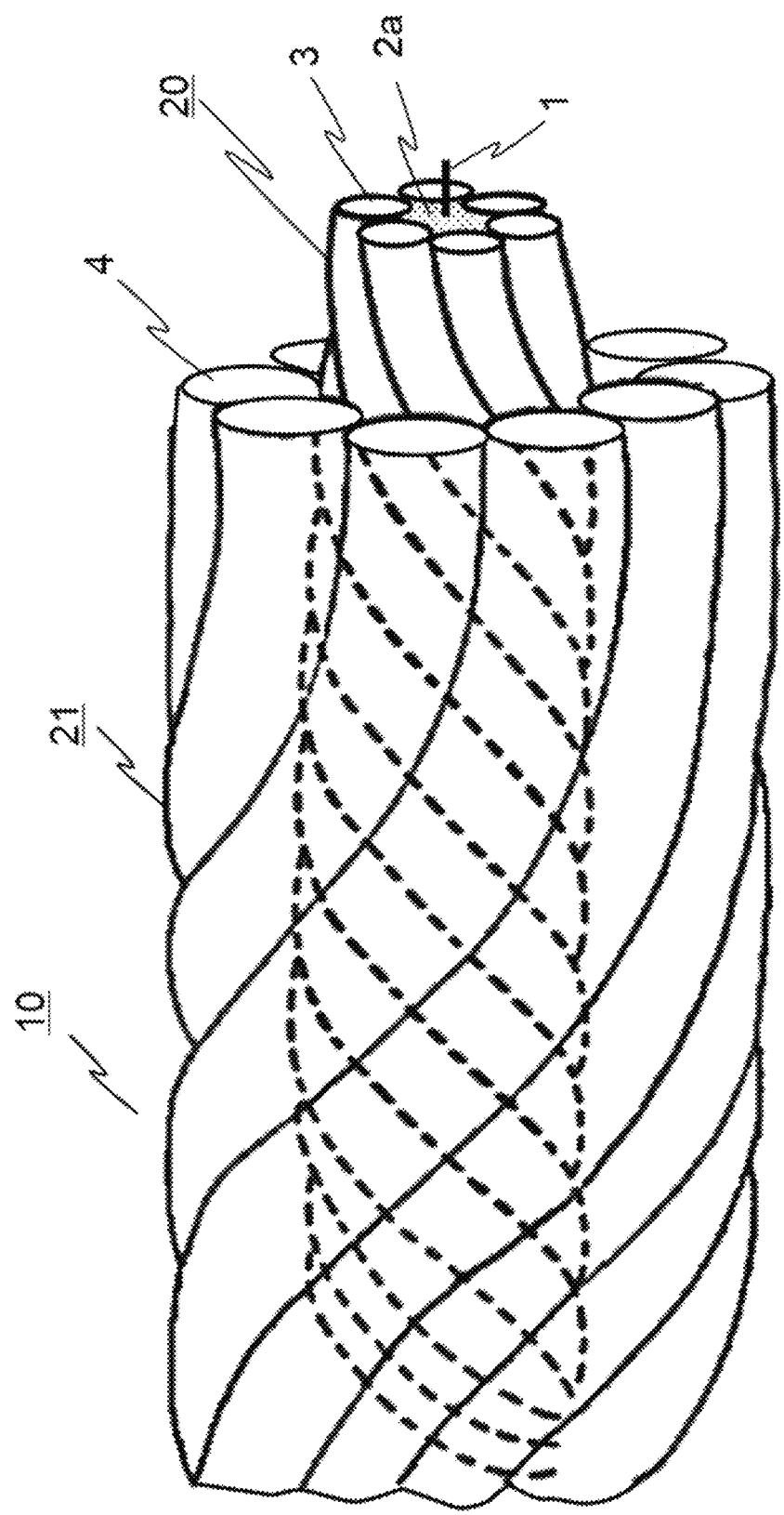
FIG. 2 is a view illustrating an example of a basic structure of an optical cable according to embodiment 1.
Figure 3:
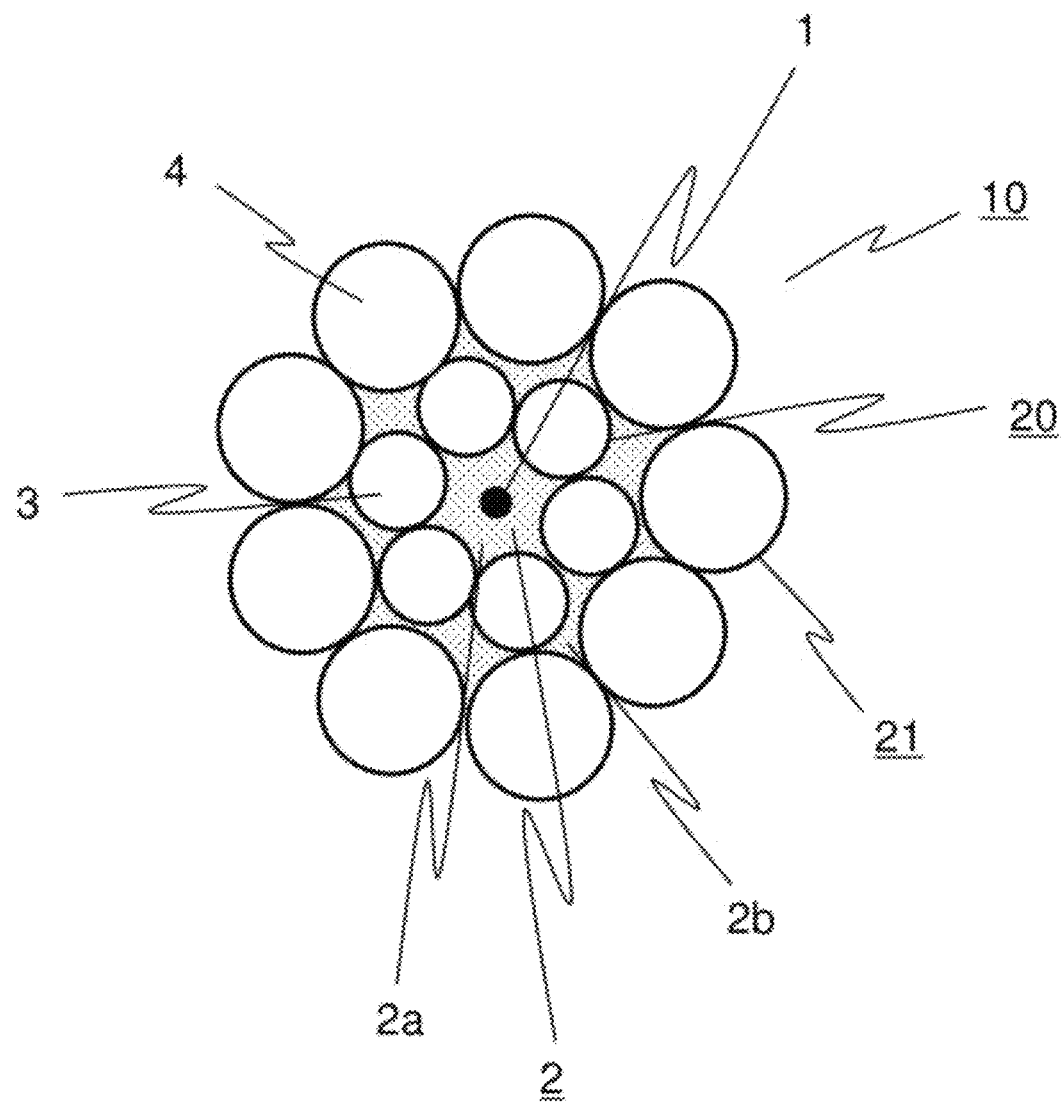
FIG. 3 is a schematic sectional view in the direction perpendicular to the axis of the optical cable shown in FIG. 2.

FIG. 2 and FIG. 3 are views showing an example of a basic structure of the optical cable 10 that can be used in the optical cable monitoring system according to embodiment 1. More specifically, FIG. 2 is a schematic view illustrating the structure of the optical cable 10 and shows the structure of the optical cable three-dimensionally. In addition, FIG. is a view showing a cross section in the direction perpendicular to the axis of the optical cable.

As shown in FIG. 2 and FIG. 3, an optical fiber 1 is provided at a center axis part of a strand 20 formed by a plurality of twisted steel wires 3 arranged in an annular shape. The surrounding area of the optical fiber 1 is filled with hydrocarbon absorbing resin 2a which is resin for absorbing hydrocarbon. On the outer side of the strand 20, a second strand 21 is provided which is formed by a plurality of steel wires 4 having a larger outer diameter than the steel wire 3, the plurality of steel wires 4 being twisted in the direction opposite to the strand 20 and arranged in an annular shape.

It is noted that the strand 20 and the second strand 21 are normally formed by armored cables, and by providing an optical fiber therein, they can be used for a so-called universal purpose such as communication or data transmission.

In the optical cable 10 according to the present embodiment 1, the gaps between the strand 20 (formed by a total of six cables in FIG. 2 and FIG. 3) and the second strand 21 are filled with hydrocarbon absorbing resin 2b similar to the above resin. It is noted that, normally, after the optical fiber 1, the strand 20, and the second strand 21 are combined with each other, the gaps therebetween are filled with the hydrocarbon absorbing resin 2, whereby the optical cable 10 is manufactured.

The hydrocarbon absorbing resin 2 is provided so as to entirely fill the gaps, and normally, the optical cable 10 having a long size of 3 km or longer is manufactured.

It is noted that the hydrocarbon absorbing resin 2 may be provided intermittently along the axial direction of the optical cable 10, and in this case, the pitch of the positions where the hydrocarbon absorbing resin 2 is provided is determined in accordance with position detection accuracy for leakage of oil or the like.

In general, the hydrocarbon absorbing resin 2 has a property of expanding in three-axis directions (directions of axes of three dimensions) when absorbing hydrocarbon, unless the resin is constrained, and as a result, due to the influence of the resin that has absorbed hydrocarbon, strain by tensile stress occurs in the optical fiber (see, for example, Non-Patent Literature 1). However, the optical cable 10 according to the present embodiment is different in that, when the hydrocarbon absorbing resin 2 has absorbed hydrocarbon, deformation of the hydrocarbon absorbing resin 2 is constrained by the presence of the strand 20, for example, and as a result, compressive strain (strain by compressive stress) occurs in the optical fiber 1.

In the above description, the optical cable 10 in which double (two layers of) strands are formed on the outer side of the optical fiber 1 has been described. However, without limitation thereto, the optical cable may be formed by only the optical fiber 1 and the strand 20 provided on the outer side of the optical fiber 1, whereby the same effect can be obtained.

Regarding the relationship between the twisting direction of the strand and the twisting direction of the second strand, forming the optical cable having a structure in which the twisting direction of the second strand is opposite to the twisting direction of the strand as shown in FIG. 2 in embodiment 1 is optimum in order to prevent fraying of the strands.

Embodiment 2

In an optical cable monitoring system 50 according to the present embodiment 2, the structure of the optical cable 10 used in the above embodiment 1 is modified to employ an optical cable that can extract only a signal that is purely based on hydrocarbon contained in an oil well by compensating for an influence of temperature, strain, pressure, or the like. Hereinafter, an optical cable 10a obtained by modifying the structure of the optical cable 10 will be described.

In the optical cable 10a according to the present embodiment 2, the steel wires 4 forming the second strand 21 of the optical cable 10 are partially changed so that an optical fiber sensor for sensing temperature, strain, pressure, or the like is provided in combination. By providing an optical fiber sensor that can sense temperature, strain, pressure, or the like in accordance with the purpose, it becomes possible to extract, from the optical fiber 1, a signal which is based on only the influence of absorption of hydrocarbon and in which an influence of temperature, strain, pressure, or the like is compensated, by using a measurement result obtained by the optical fiber sensor as described above.

That is, in the case where it is required to employ a cable also having a function of DPATS (abbreviation of Distributed Pressure, Acoustic, Temperature and Strain sensing) in combination, the optical cable 10a according to the present embodiment 2 can be used. In other words, if compensation for temperature is needed, another optical fiber for measuring temperature may be prepared, if compensation for strain is needed, another optical fiber for measuring strain may be prepared, and if compensation for pressure is needed, another optical fiber for measuring pressure may be prepared.

Figure 4:
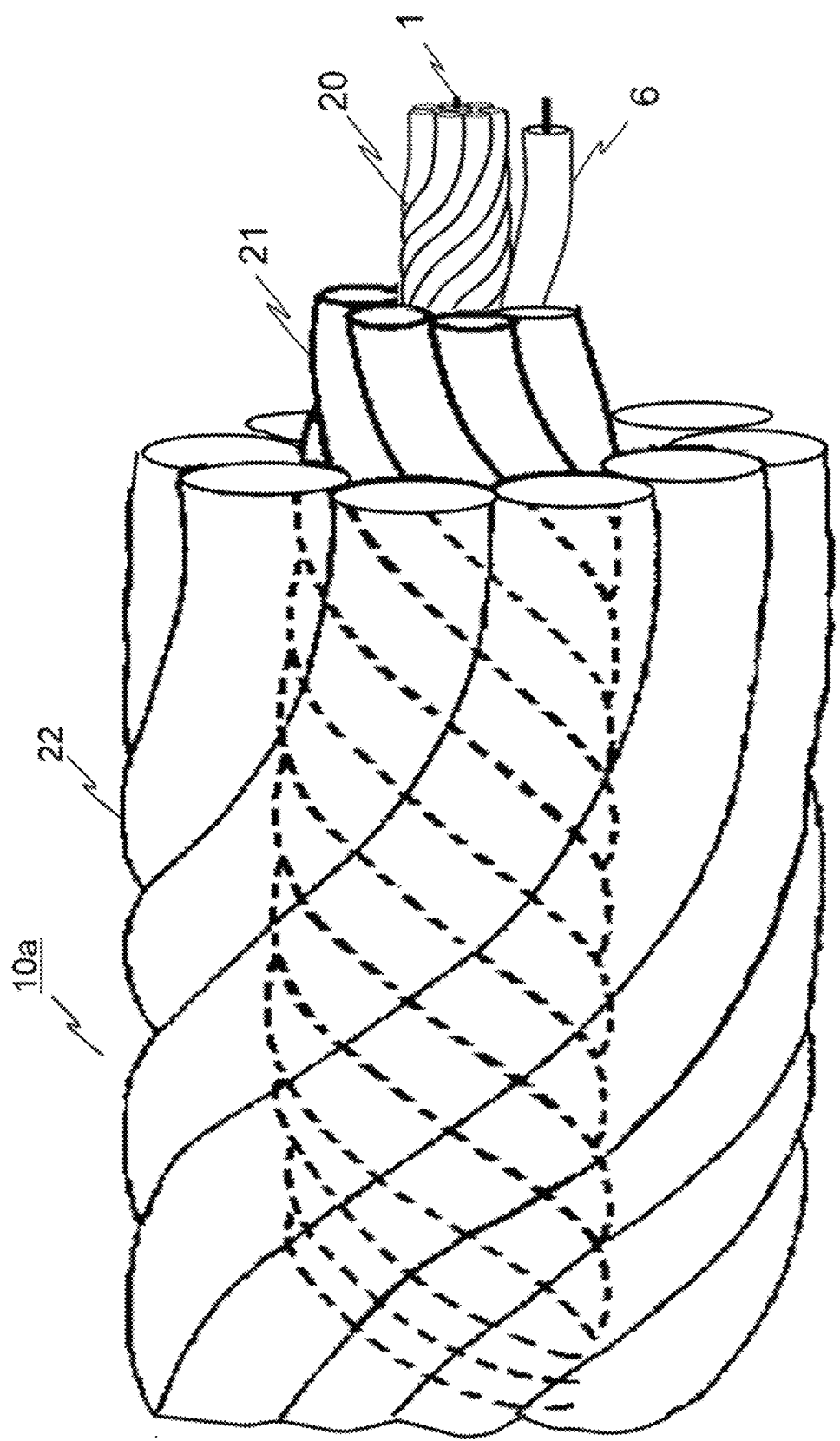
FIG. 4 is a view illustrating another example of a basic structure of an optical cable according to embodiment 1.
Figure 5:
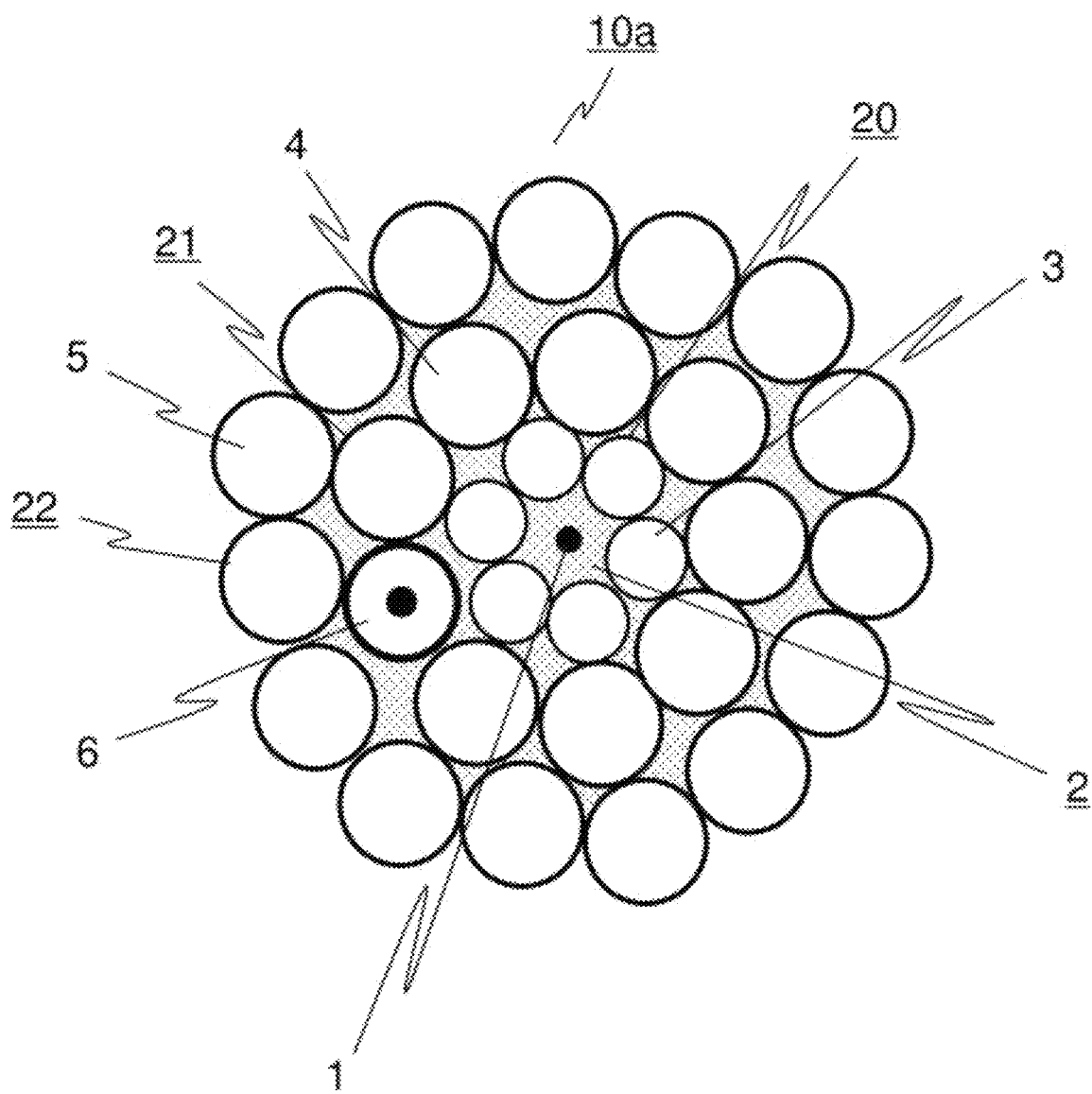
FIG. 5 is a schematic sectional view in the direction perpendicular to the axis of the optical cable shown in FIG. 4.

Hereinafter, a specific example of an optical cable having a DPATS function will be described with reference to the drawings. FIG. 4 is a view showing an example of a basic structure of the optical cable 10a including a physical quantity measurement optical fiber 6 for measuring a physical quantity of a measurement target. FIG. 5 is a schematic sectional view in the direction perpendicular to the axis of the optical cable 10a shown in FIG. 4.

As shown in FIG. 4 and FIG. 5, the optical cable 10a has a feature in which a third strand 22 formed by a plurality of steel wires 5 is newly provided at a position which corresponds to the outermost circumferential portion and which corresponds to the outer side of the optical cable described in embodiment 1, and a physical quantity measurement optical fiber 6 for measuring temperature, strain, pressure, or the like of a measurement target is newly provided on the inner side of the third strand 22 so as to replace a part of the second strand 21. It is noted that the gaps between the optical fiber 1, the strand 20, the second strand 21, and the third strand 22 are filled with hydrocarbon absorbing resin 2 as in the case of the optical cable 10 described above. Oil is to enter the areas filled with the hydrocarbon absorbing resin 2.

The reason for having the above configuration is as follows. Normally, in an optical cable having multilayer (multiplex) strands, even if the physical quantity measurement optical fiber 6 (here, in particular, a temperature measurement optical fiber is meant) is located on the inner side to some extent, the outer temperature is transferred thereto and thus detection thereof is possible. In addition, providing the physical quantity measurement optical fiber 6 on the inner side has an advantage in protecting the physical quantity measurement optical fiber 6 itself. It is noted that the optical cable itself cannot become an oil leakage passage.

It is noted that, normally, in a multilayer optical cable, the gaps between the outer layer and the inner layer of the optical cable are filled with a protection material or the like. Therefore, it is also possible to provide, on the outermost circumference of the optical cable, a cable wire for the purpose of detecting leakage of oil or the like, and this is further advantageous in terms of enhancing detection performance.

In the above description, the optical cable is manufactured such that the hydrocarbon absorbing resin 2 fills the gaps between the optical fiber 1, the strand 20, and the second strand 21, or the gaps between the optical fiber 1, the strand 20, the second strand 21, and the third strand 22. However, without limitation thereto, the optical cable manufactured such that an overcoat is provided on the surface of the optical fiber 1 may be used, whereby the same effect can be obtained.

The optical cable filled with the hydrocarbon absorbing resin 2 has a life of at least fifty years under an environment of 200° C. It is noted that, in the case where this optical cable is used under the environment of low temperature and shallow depth, the life thereof is expected to be semipermanent.

Next, a verification experiment conducted for the hydrocarbon detection function of the above optical cable, and a result thereof, will be described with reference to the drawings. Here, in particular, verification was conducted using an optical cable having a structure which was formed by only an optical fiber and a (one layer of) strand in the innermost layer on the immediately outer side of the optical fiber, and which is a basic structure for confirming the operation and effect in the case of providing resin for detecting hydrocarbon, as described in the above embodiment 1.

Figure 6:
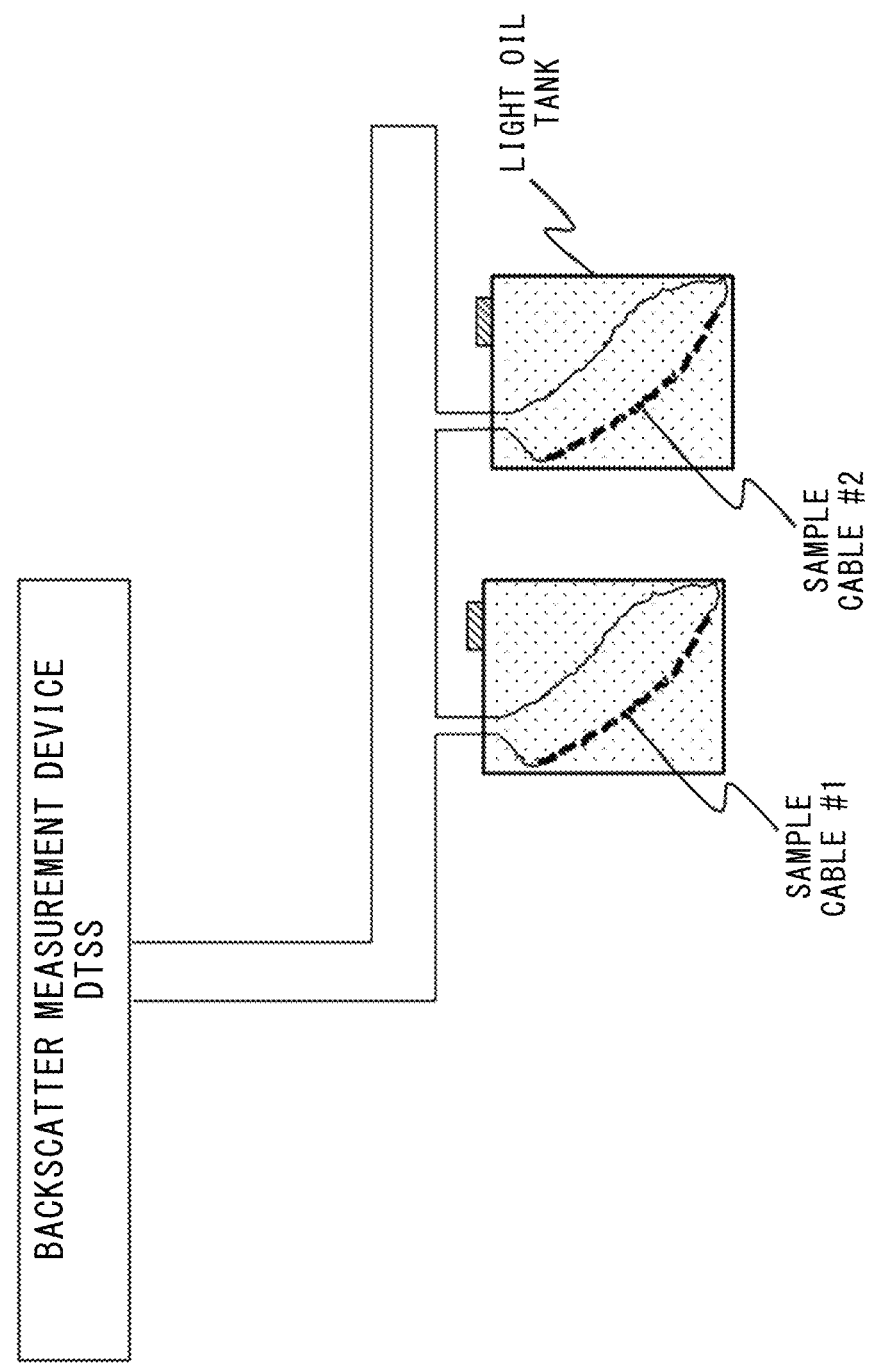
FIG. 6 is a schematic configuration diagram of an oil immersion testing device for an optical cable used in the optical cable monitoring system according to embodiment 1.

FIG. 6 shows a schematic configuration of experimental equipment used in the verification experiment. One sample cable (optical fiber cable having a hydrocarbon detection function) was immersed in each of two light oil containers, and the shift amount of backscatter light occurring when each cable absorbed hydrocarbon in the light oil was measured by a hybrid backscatter light measurement device DTSS (abbreviation of Distributed Temperature and Strain Sensing) which was connected to these cables and was capable of measuring two kinds of frequency shifts by one device.

Here, the two kinds of frequency shifts are respectively measured through frequency shift analysis by pulse pre-pump Brillouin optical time domain analysis (PPP-BOTDA) for Brillouin scattering light, and frequency shift analysis called tunable wavelength coherent optical time domain reflectometry (TW-COTDR) for Rayleigh scattering light. Therefore, even when the temperature and strain are changed at the same time, the amounts of both changes can be analyzed.

Figure 7:
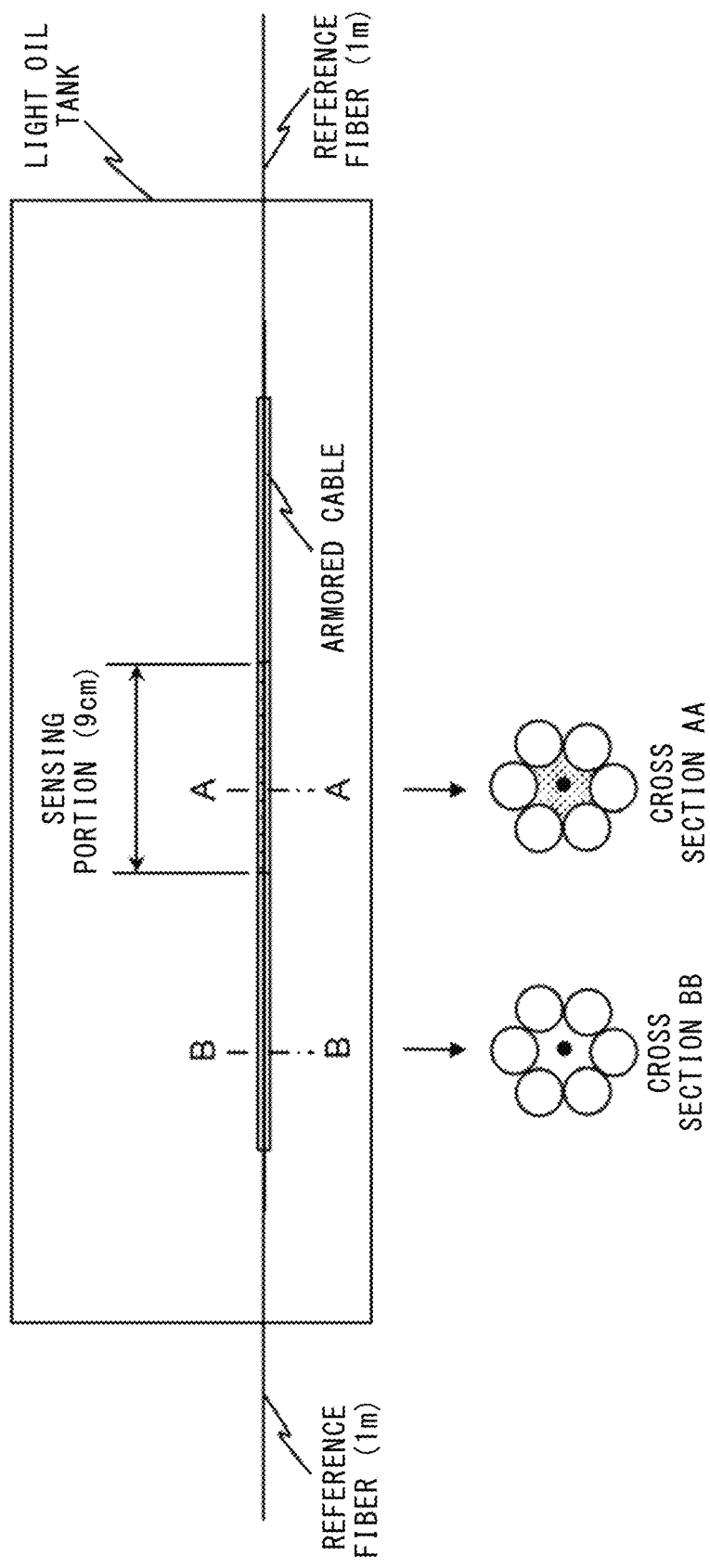
FIG. 7 is a view illustrating an optical cable sample used in the oil immersion test shown in FIG. 6.

FIG. 7 shows the details of the specifications of each sample cable used in the verification experiment. An optical fiber having a sensing portion in which the surrounding area of the optical fiber is filled with resin having a hydrocarbon detection function, is retained inside an armored cable. A part having a length of 9 cm shown as "SENSING PORTION" in FIG. 7 is the sensing portion for detecting hydrocarbon.

A sectional view of the sensing portion at position A-A as a representative is shown as cross section AA downward of the sensing portion. As shown in the sectional view, the surrounding area of the optical fiber provided at the center part is filled with resin having hydrocarbon detection function, which is shown by a multi-dot pattern. In addition, a sectional view of the armored cable at position B-B is shown as cross section BB at the left of the cross section AA. As shown in the sectional view, at position B-B, the surrounding area of the optical fiber is not filled with the above resin having a hydrocarbon detection function. As described above, the sensing portion is filled with resin having a hydrocarbon detection function, whereas the part other than the sensing portion, of the armored cable is not filled with resin having a hydrocarbon detection function.

In addition, reference fibers (not in armored cable form) each having a length of 1 m are respectively connected to both ends of the optical fiber. The sample cable configured as described above is retained with the entire armored cable part immersed in a container (containing hydrocarbon) in which light oil is stored.

As described above, the length of the sensing portion is short as compared to the other part. Therefore, it is considered that strain change due to temperature change and/or pressure change thereof is small and negligible as compared to strain change due to absorption of hydrocarbon components.

FIG. 8 is a table showing the specifications of the hybrid backscatter light measurement device. Since the measurement functions thereof include two major functions of PPP-BOTDA and TW-COTDR described above, the specifications are shown for each of both functions. As shown in the table, both functions are the same in distance range, distance resolution, and the like, but are greatly different in frequency characteristics.

Figure 9:
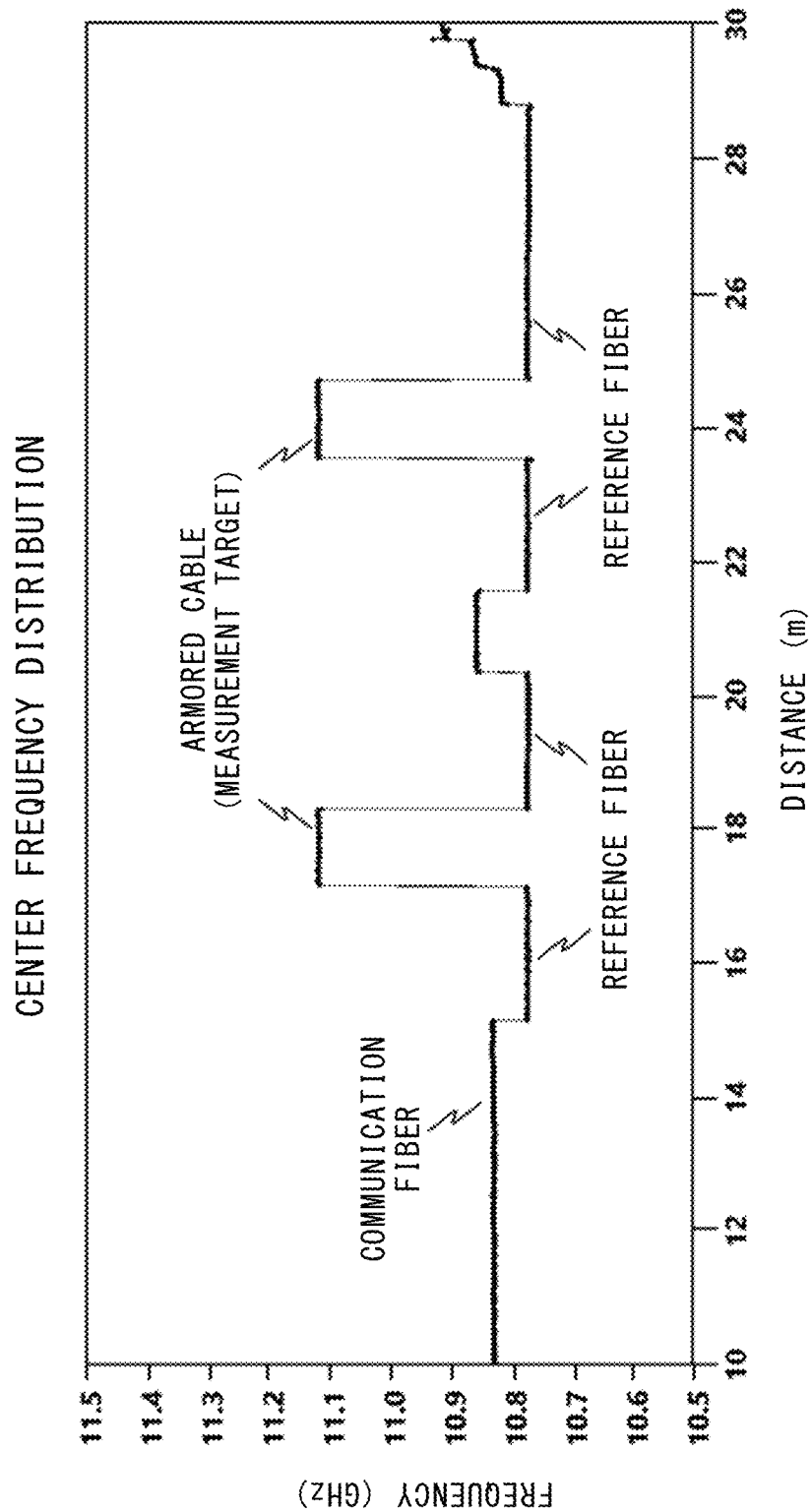
FIG. 9 shows an example of center frequency characteristics of optical cable samples in a characteristics measurement test shown in FIG. 8.

Next, FIG. 9 shows center frequency distributions in constituent component parts of the above two sample cables in the case where these sample cables were subjected to frequency shift analysis by PPP-BOTDA.

This diagram shows the characteristics before the sample cables were immersed in the light oil. It is found that the armored cable parts to be measured exhibit center frequencies of about 11.1 GHz, and the reference fiber parts exhibit center frequencies of about 10.8 GHz.

Figure 10:
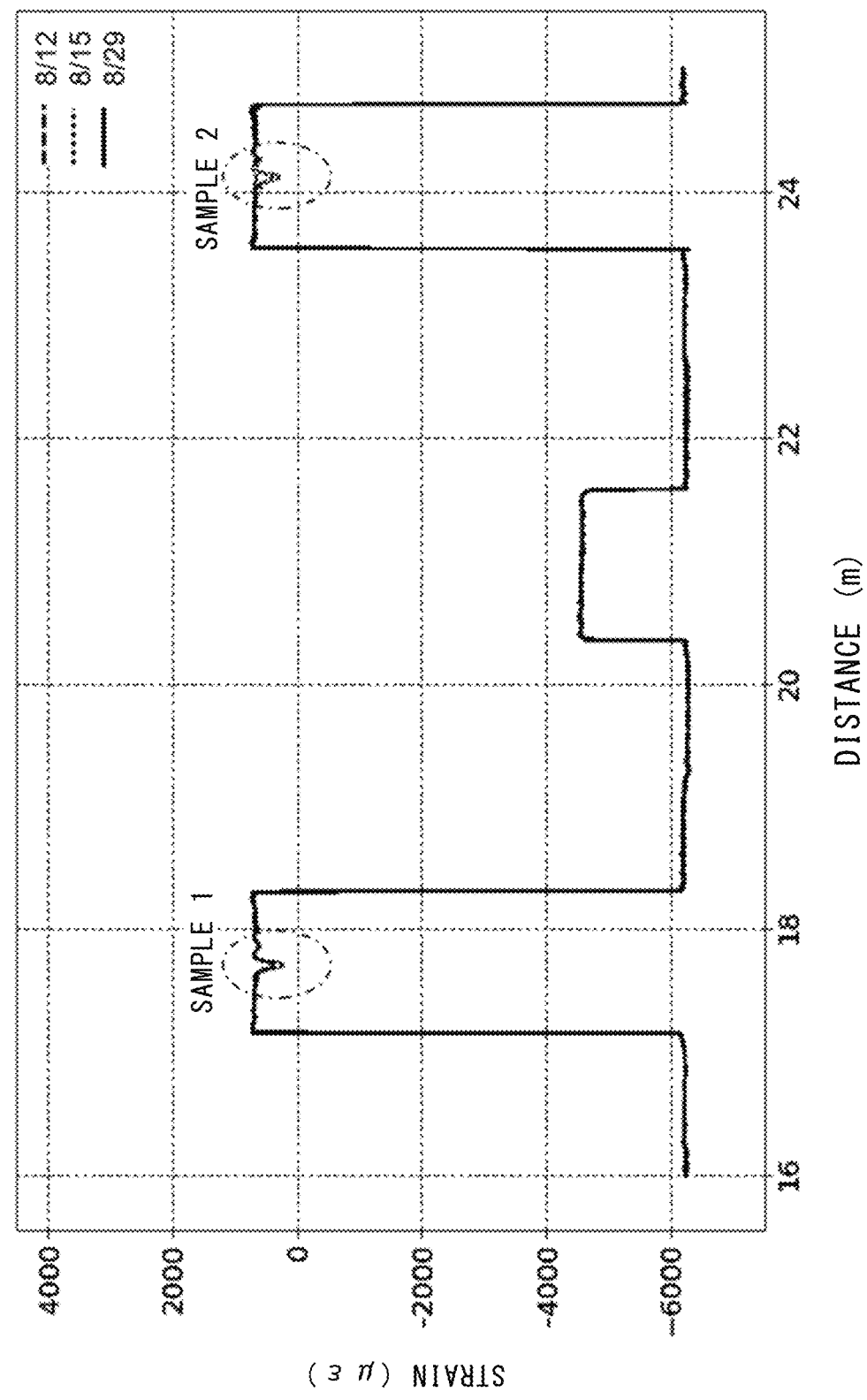
FIG. 10 shows a measurement example of strain distributions of two optical cable samples in the oil immersion test shown in FIG. 6.

Next, FIG. 10 shows a measurement example of strain distributions of the two sample cables. For both samples, occurrence of strain is recognized which is considered to be caused by absorption of hydrocarbon as a result of immersion in the light oil (center part in the strain distribution of each sample is recessed).

Figure 11:
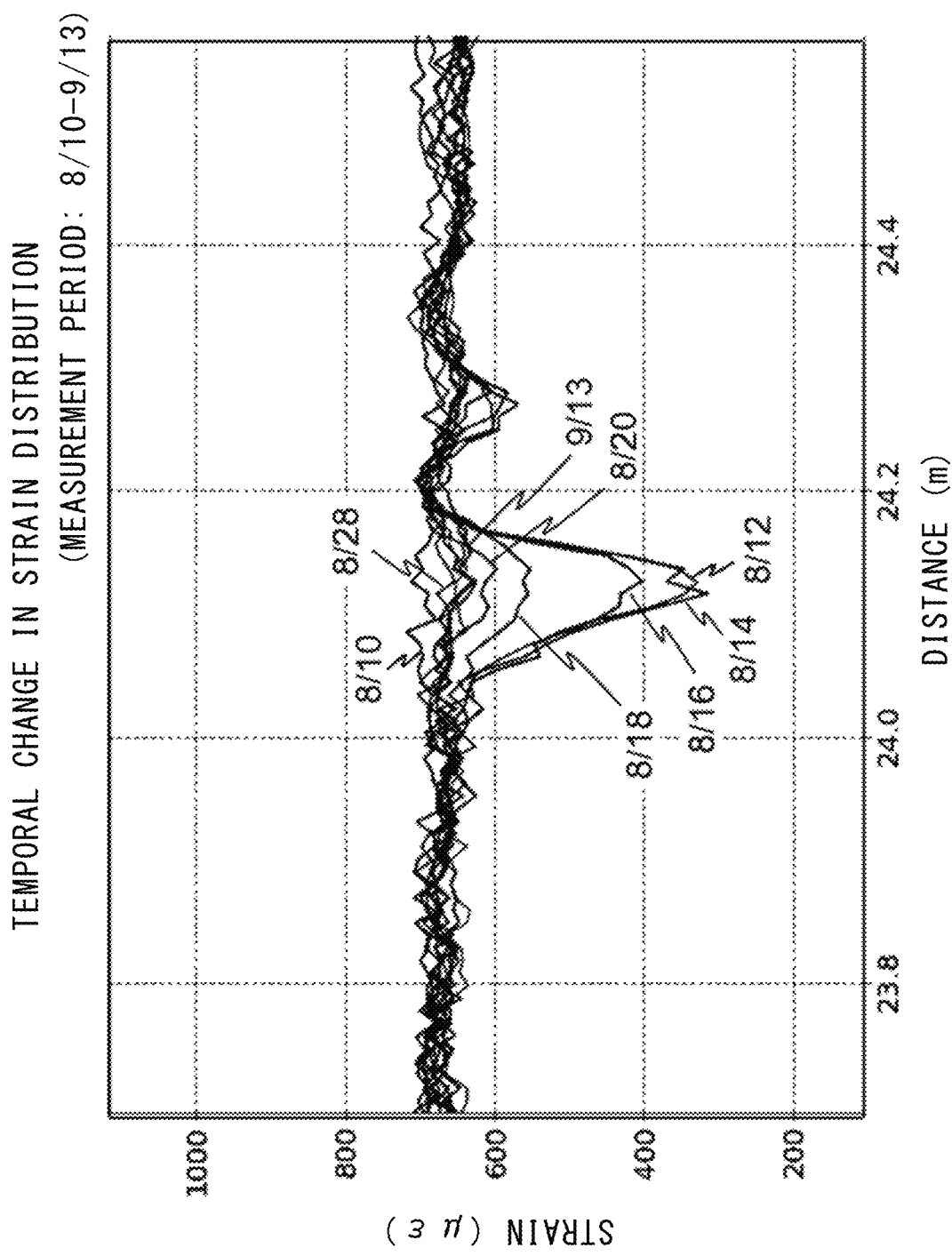
FIG. 11 shows an example of temporal change in the strain distribution of the optical cable sample in the oil immersion test shown in FIG. 6.

Next, FIG. 11 shows temporal change in the strain distribution in the case where the strain distribution was measured for the sample cable #2 during about one month. Numerical values indicating each data in FIG. 11 show the date of measurement of the strain distribution.

As shown in FIG. 11, the strain distribution greatly changes. It is considered that such a change was caused due to gradual increase of the content of hydrocarbon compounds in the infill.

Figure 12:
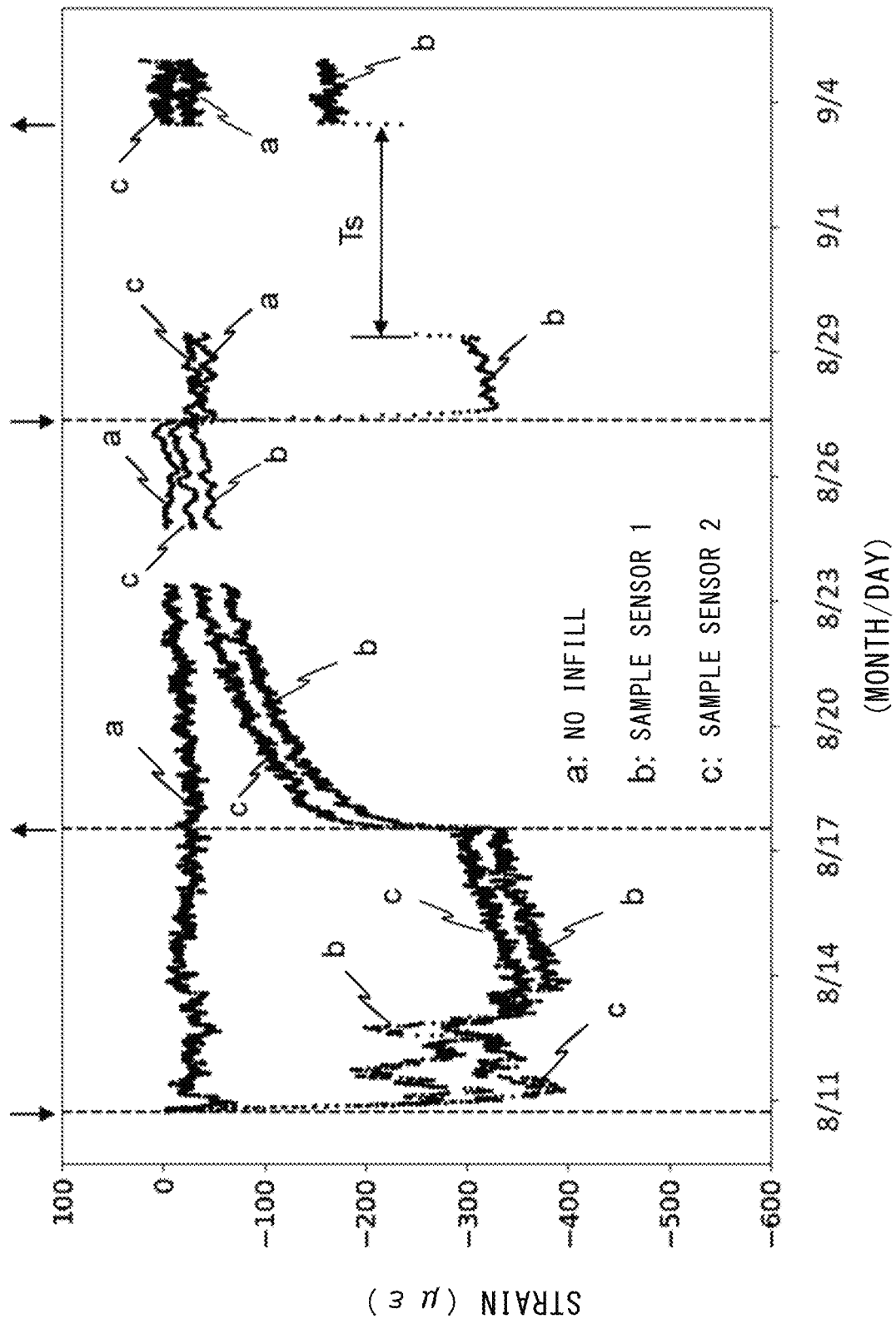
FIG. 12 illustrates an effect of infill in strain distribution measurement for the optical cable samples in the oil immersion test shown in FIG. 6.

Finally, FIG. 12 shows temporal changes in strain distributions in the case of providing the infill which is resin having a hydrocarbon detection function and in the case of not providing the infill, with the horizontal axis indicating the measurement dates. In FIG. 12, downward arrows (two in total) indicate the times at which the sample cables were immersed in the light oil, and upward arrows (two in total) indicate the times at which the sample cables immersed in the light oil were extracted therefrom. It is noted that an interval Ts indicated by a double-headed arrow is the period during which the measurement was stopped. It is found that strain change clearly occurred as a result of the infill absorbing hydrocarbon by the sample cable (having infill) being immersed in the light oil.

Figure 13:
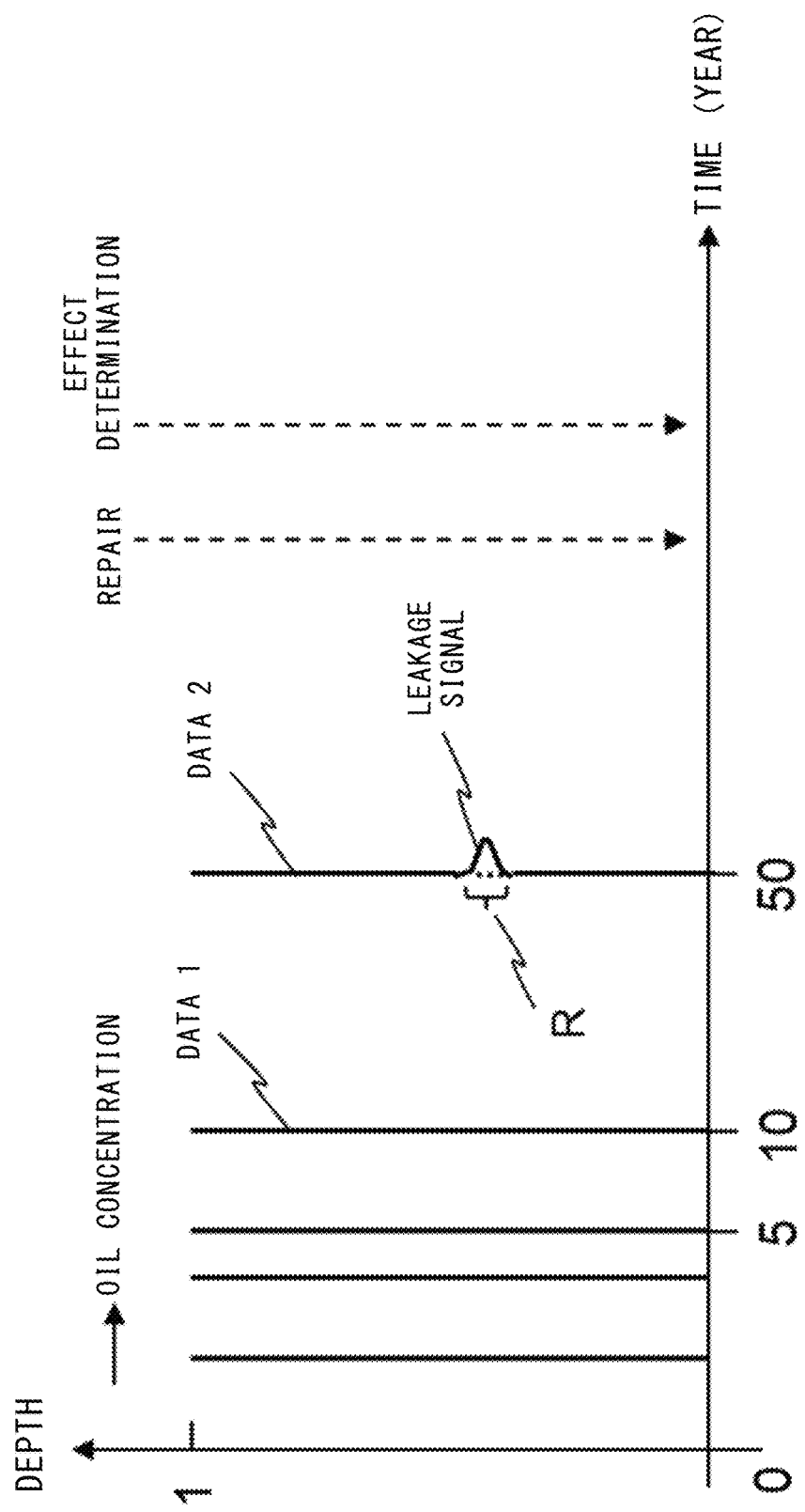
FIG. 13 is a schematic diagram showing an example of monitoring data of the optical cable monitoring system according to embodiment 1.
Figure 14:
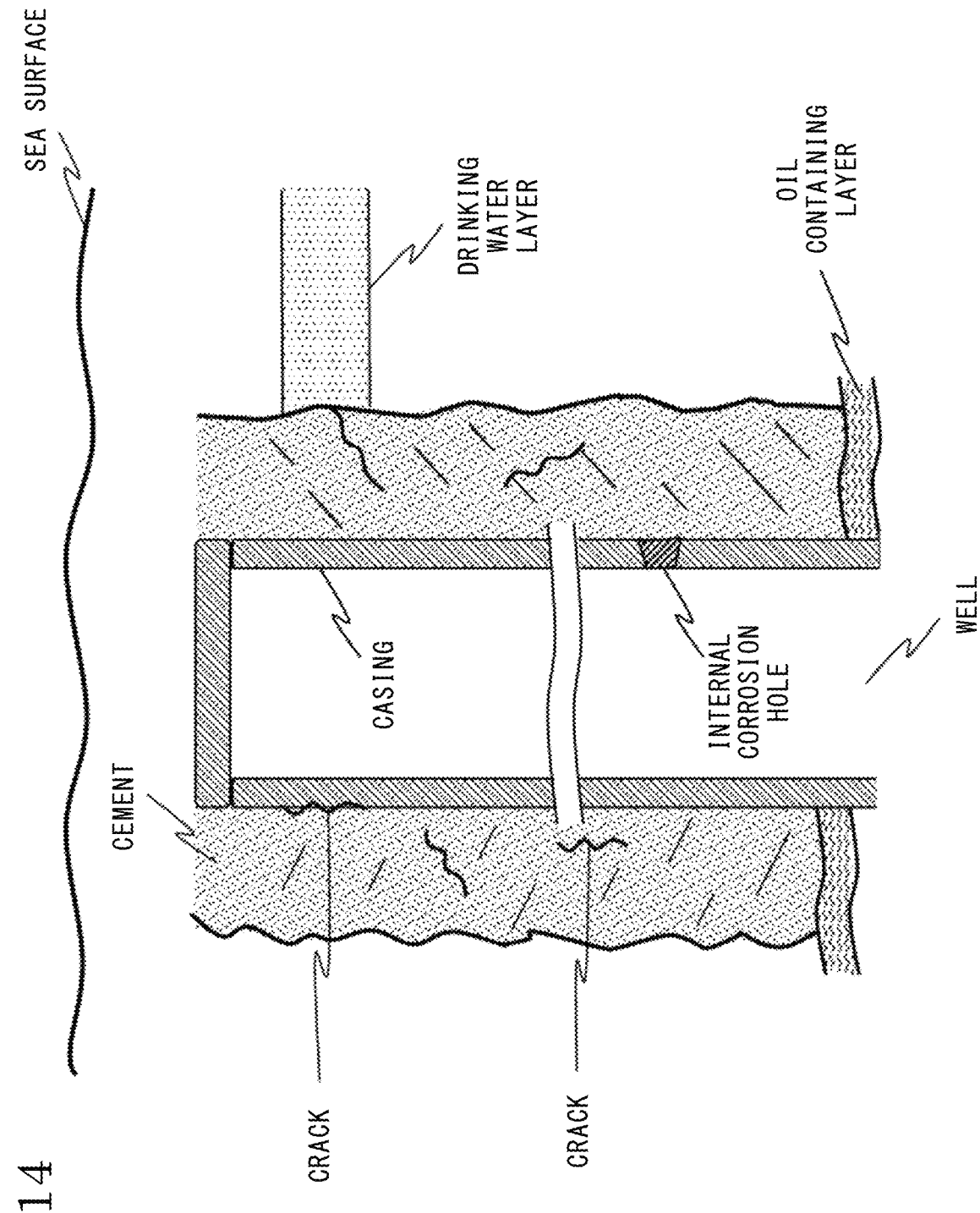
FIG. 14 is a view illustrating a problem of an optical cable monitoring system.
Figure 15:
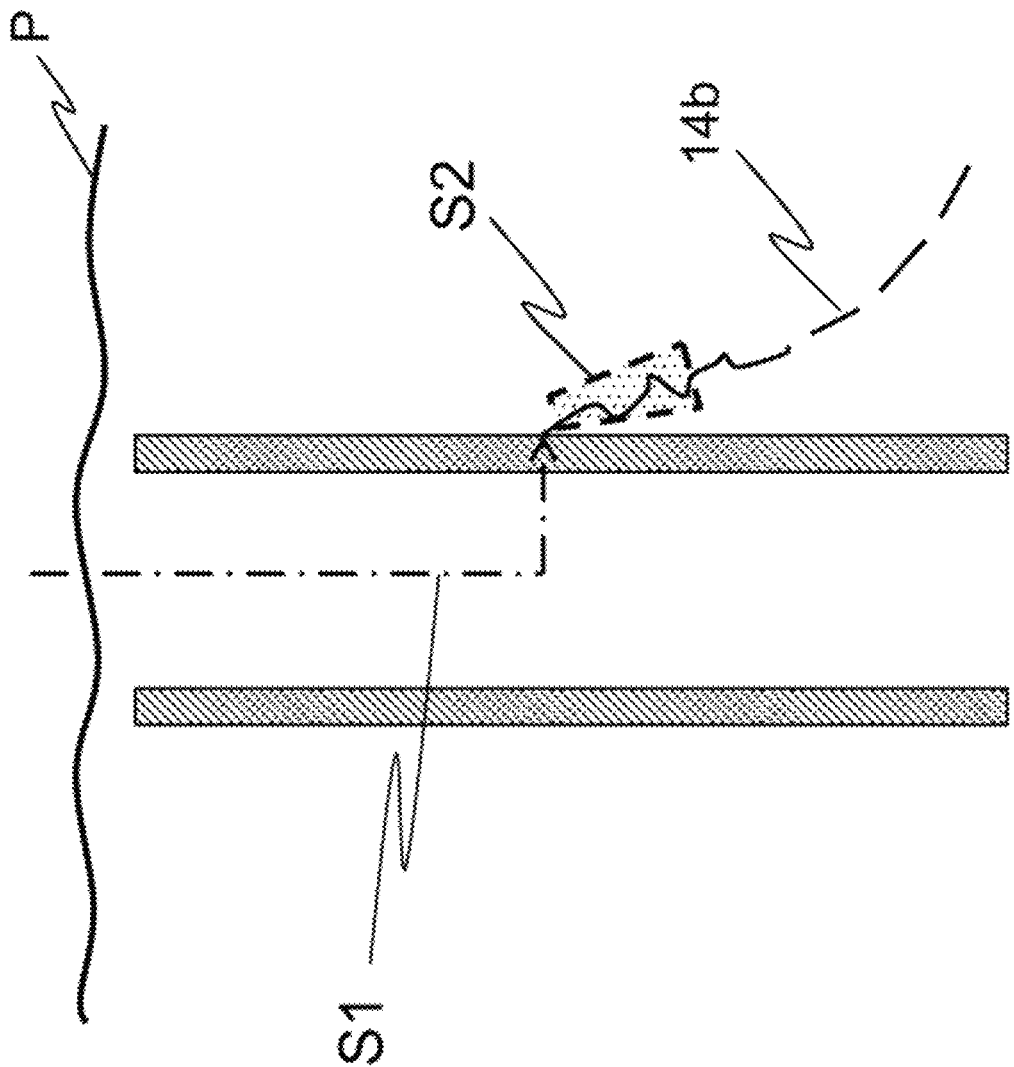
FIG. 15 is a view showing an example of a conventional optical fiber cable monitoring system.

Next, the case where the optical cable 10 or 10a is used for monitoring an oil well or the like over a long term (about fifty years) will be described with reference to FIG. 1 and FIG. 13.

In the monitoring, presence/absence of leakage of oil or the like is determined on the basis of whether or not the optical cable 10 has detected hydrocarbon which is a main component of the oil. That is, if hydrocarbon is detected in the resin provided in the optical cable 10 at some part from the uppermost position of the well 100 shown in FIG. 1 (the height position corresponding to the ocean floor in FIG. 1; in FIG. 13, the point at which the depth value is 0 (zero) indicates the height position corresponding to the ocean floor) to the lowermost position of the well 100 (the height position corresponding to a depth value of 1 in FIG. 13), the scattering light shift amount at the detection part is outputted as a leakage signal indicating a shift amount different from the shift amounts at the other positions (see FIG. 13). The location (depth position) indicating the above different output is a part where leakage of oil or the like has occurred. In addition, in FIG. 13, it is found that a leakage signal is detected only after fifty years has passed since the oil well was installed. In addition, it is found that the leakage position is slightly lower than the center height position of the well 100.

Here, it is considered that the scattering light shift amount that has changed due to hydrocarbon absorbed by the resin is not influenced by the position in the depth direction of the well 100 and changes depending on only the amount of the absorbed hydrocarbon, whereas the temperature, pressure, strain, and the like are highly likely to change depending on the position in the depth direction. In the case where the influences of these are great, it is necessary to correct the amount of scattering light shift due to these. In such a case, the optical cable 10a having the DPATS function described above can be used.

As described above, in the optical cable monitoring system 50 using the optical cable 10 or 10a, the depth position of leakage of oil or the like in a well that is an inspection target is detected, and therefore, by performing local repair at the position where the leakage is detected, the well can be repaired, so that the life thereof can be prolonged without disposing of the entire well.

In addition, after the local repair, presence/absence of a leakage signal in the optical cable monitoring system 50 is checked, and if no leakage signal is detected, it can be confirmed that an effect of the repair of the leakage has been obtained.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 optical fiber
2, 2a, 2b hydrocarbon absorbing resin
3, 4, 5 steel wire
6 physical quantity measurement optical fiber
10, 10a optical cable
20 strand
21 second strand
22 third strand
40 backscatter light measurement device
50 optical cable monitoring system
100 well

The invention claimed is:
1. An optical cable comprising:
an optical fiber;
a strand including a plurality of cables provided in a radial direction of the optical fiber, the plurality of cables being twisted so as to surround an outer circumference of the optical fiber and arranged in an annular shape;

a second strand including a plurality of cables provided in the radial direction of the optical fiber, the plurality of cables being twisted so as to surround an outer circumference of the strand and arranged in an annular shape, the plurality of cables having a larger outer diameter than the cables of the strand;

a physical quantity measurement optical fiber provided so as to replace one of the cables of the second strand and configured to measure temperature, strain, or pressure which is a physical quantity of a measurement target;

a third strand including a plurality of cables provided in the radial direction of the optical fiber, the plurality of cables being twisted so as to surround an outer circumference of the second strand and arranged in an annular shape, the plurality of cables having a larger outer diameter than the cables of the second strand; and hydrocarbon absorbing resin configured to absorb hydrocarbon and filling gaps between the optical fiber, the strand, the second strand, and the third strand, wherein frequency shift in signals from the physical quantity measurement optical fiber, influenced by the physical quantities including temperature, strain, or pressure, is used to correct signals from the optical fiber, so that frequency shift in the corrected signals is influenced only by expansion of the hydrocarbon absorbing resin caused by the absorbed hydrocarbon.

2. The optical cable according to claim 1, wherein the hydrocarbon absorbing resin is provided intermittently along a longitudinal direction of the strand.

3. An optical cable monitoring system comprising:
the optical cable according to claim 1; and
a backscatter light measurement device configured to measure frequency shifts of Brillouin scattering light and Rayleigh scattering light, wherein
frequency shift change of the optical fiber due to the hydrocarbon absorbing resin absorbing hydrocarbon contained in a measurement target, and frequency shift change of the optical fiber due to change in pressure, strain, or temperature which is a physical quantity of the measurement target, are measured in a discriminated manner.

4. The optical cable monitoring system according to claim 3, wherein
the frequency shift change of the optical fiber due to absorption of hydrocarbon contained in the measurement target, which is measured in a discriminated manner against the frequency shift change of the optical fiber due to change in pressure, strain, or temperature which is the physical quantity of the measurement target, and an occurrence position in the optical fiber where the frequency shift change of the optical fiber due to absorption of hydrocarbon contained in the measurement target occurs, are measured so as to be associated with each other.

5. A well monitoring method for monitoring leakage of oil from a well, using the optical cable monitoring system according to claim 4, in which an optical fiber for detecting hydrocarbon is installed along a depth direction on an outer side of the well, the well monitoring method comprising:
recording temporal change at a position, in the well, of a leakage signal which is a signal in which a scattering light shift amount due to hydrocarbon detected by the optical fiber differs from scattering light shift amounts at other positions because of the leakage of oil; and
at the position where the leakage signal is detected, repairing the well and confirming presence/absence of detection of the leakage signal after the repair, to determine whether or not the repair of the well has been properly performed.

* * * * *